3,435,188
ELECTRIC SOLDERING IRON WITH A LOW
ADHESIVE PROTECTIVE SLEEVE
Allison C. Collard, Douglaston, N.Y., assignor to Patent
Service Corporation of America, New York, N.Y.
Filed June 6, 1966, Ser. No. 555,312
Int. Cl. H05b 3/42
U.S. Cl. 219—237                                      4 Claims

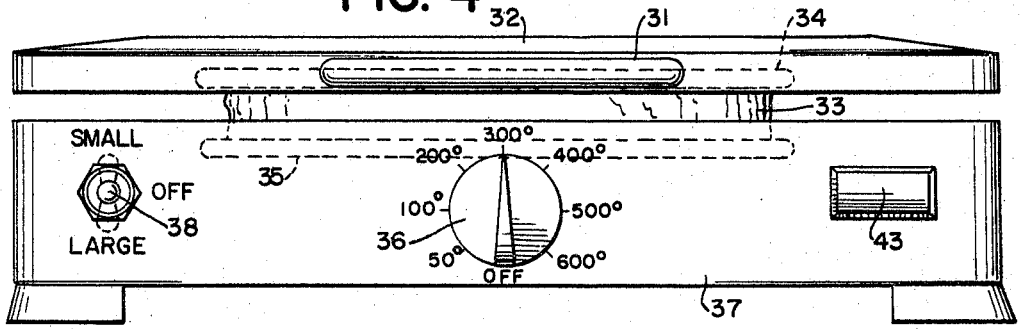
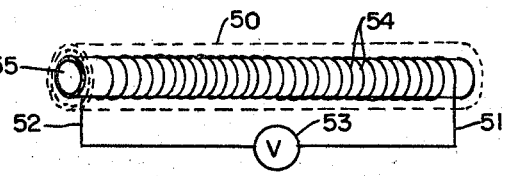
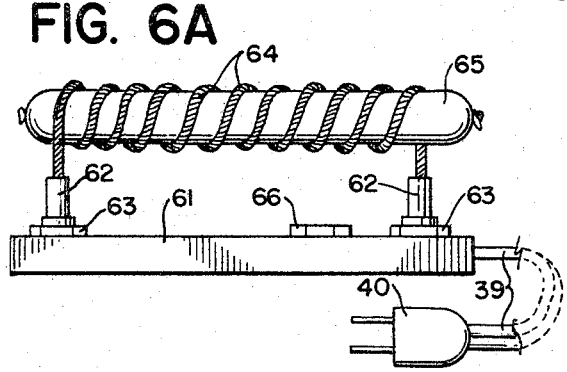
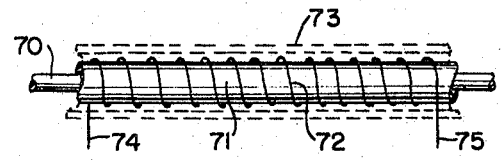
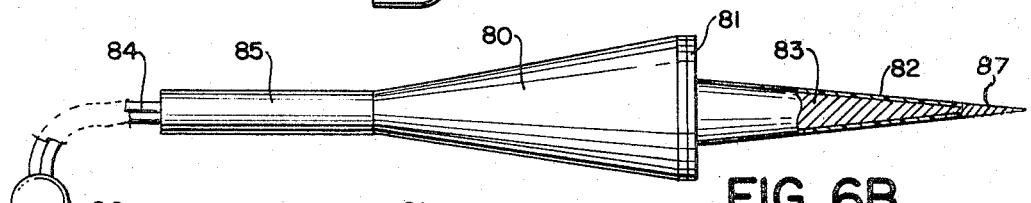
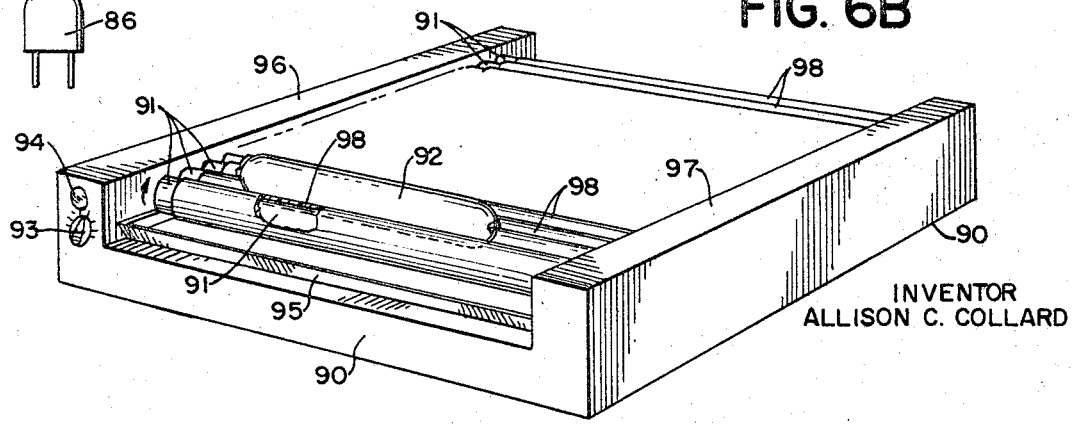
INVENTOR
ALLISON C. COLLARD United States Patent Office 3,435,188
Patented Mar. 25, 1969

ABSTRACT OF THE DISCLOSURE

A heating apparatus having one or more extending members which serve as heating elements and include a low adhesive, high temperature resistant sleeve secured to the external surfaces of the heating elements. The sleeve may consist of a shrinkable tube of a fluorocarbon polymer such as Teflon which after being treated by either heat or chemicals, shrinks around the heating element to form a tight bond therewith. The heating element may then be placed in direct contact with articles to be heated without contamination.

---

This invention relates to an apparatus for providing heater coated with a low adhesive material. More specifically, this invention relates to a heating apparatus which may be easily cleaned and sterilized from all foreign matter.

In broiling steaks, chops and other food articles, either over an open flame or in electric or gas ovens, whereby the food articles being cooked or broiled are supported on steel racks having a plurality of grids resembling a grate structure, it has been found that due to the intensity of the heat during the cooking operation, that portions of the food or other articles being cooked stick to the grill. This problem is not particularly noticeable in meats having a high fat content such as pork, but becomes particularly acute for meats having low fat content, such as lean steaks, and fish products. These latter types of food have a tendency to adhere to the rods of the grill and oftentimes a spatula or other instrument must be employed to pry these food articles away from the grill before they can be served.

It is therefore a primary object of the present invention to provide a grill having longitudinal supporting rods which are coated with a low adhesive material capable of completely surrounding the rods.

It is another object, according to the present invention, to provide a low adhesive coating for cooking grills and the like which can sustain the high temperatures experienced during cooking operations without undergoing deformation or decomposition.

It is another object, according to the present invention, to provide a low adhesive coating or sleeving which may be shrunk by the application of heat, chemical treatment, or other means around each of the rods of a grill to form a low adhesive protective coating thereon.

It is still another object, according to the invention, to provide a grill having low adhesive properties that is easy to manufacture, inexpensive to produce, and readily adaptable to mass production techniques.

It is still a further object, according to the present invention, to provide a grill having a low adhesive material bonded or surrounding each of the depending rods of the grill wherein an electric current or other heating means is applied to the rods in order to heat the grill and thereby cook all foods in contact therewith.

It is still a further object, according to the invention, to provide a low adhesive grill having an electric current passing therethrough which when placed in contact with food articles to be cooked produces a charcoal broiling effect on the food and sears the flavor within the food, thereby producing cooked food articles having an enhanced and enriched taste.

It is well-known in the art that there are certain low adhesive materials which when bonded or laminated to cooking utensils provide a coating to the utensils having low adhesive properties and have the advantage that relatively few articles coming in contact with the low adhesive material will stick thereto so that the cooking utensils may be easily cleaned without a great deal of scouring and scrubbing. These low adhesive materials such as the chemical Teflon are also capable of withstanding extreme temperatures in excess of 500° F. for long periods of time without checking, decomposing or significantly changing their dimensional length. Before the advent of Teflon-lined bake pans, fry pans and other cooking utensils, it was common to employ aluminum foil or other metal foil within the base of the pans to which the food articles were placed so that the articles could be easily removed from the cooking utensils ready to be served. However, the use of metal foil as a liner for these cooking utensils had the disadvantage that for food having a low fat content, the metal foil ended up adhering to the food articles and had to be carefully picked away from the food before it could be served.

In the present cooking utensils employing low adhesive coatings such as Teflon heat and pressure are employed against the material for bonding to the metallic surfaces of the cooking utensils.

The low adhesive material is now being produced in the form of hollow tubes which may be slidably inserted over the rods of any cooking grill and bonded thereto. The low adhesive materials are also provided in shrinkable tubing form whereby upon the application of heat, chemicals or other treatments, the tube will shrink around any rod or grate forming a tight bond with the rod, thereby producing a low adhesive surface on the grill.

Further objects and advantages of the invention become apparent from the following description taken together with the claims and drawings annexed to and forming a part of this specification.

FIG. 1 discloses a typical grill having longitudinal supporting members and coated with a shrinkable non-adhesive tubing material according to the invention.

FIG. 4 is a front view of the apparatus of FIG. 3.

FIG. 5 is an enlarged view partly in section of a portion of the heating element of the apparatus employed in the embodiments of FIGS. 2–4.

FIG. 6A is another embodiment, according to the present invention, disclosing a spirally wound heating coil apparatus releasably mounted on a base for cooking cylindrically shaped food articles such as frankfurters.

FIG. 6B is still another embodiment according to the present invention showing the application of low adhesive, heat resistant sleeving to a conventional parallel roller broiling apparatus;

FIG. 7 is an enlarged view of a portion of the heating elements that is employed in the embodiment of FIG. 6A having a hollow rod as its core and sandwiched together in a Teflon sleeve together with a spirally wound heating element such as a Nichrome wire to produce stiffened heating element having the properties of rigidity for use in particular cooking applications.

FIG. 8 discloses a novel soldering iron having a low adhesive tip.

Figure 1:
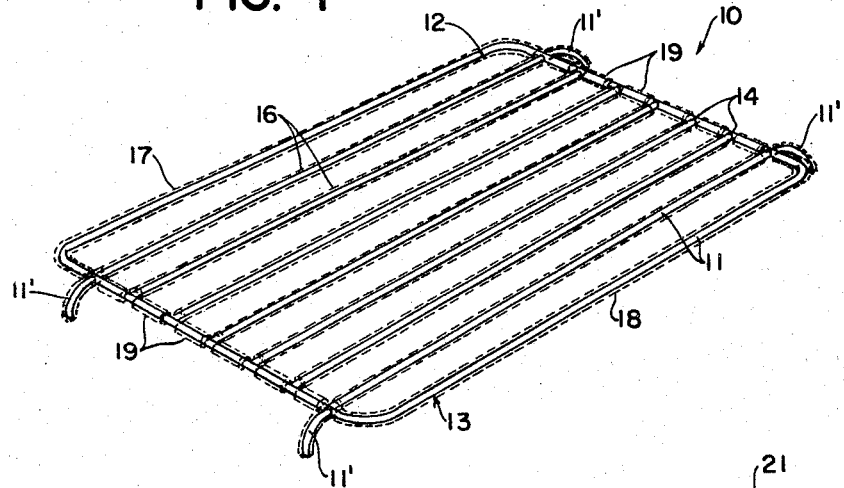

Referring to FIG. 1, there is shown a grill 10 having longitudinal cross members consisting of rods 11, each of which is coupled at its ends to a rectangularly-shaped hoop 13 which is welded together at abutment 12. The hoop and its longitudinally extending rod members are pre-assembled with shrinkable Teflon sleeves inserted thereover prior to the welding of the longitudinal rods along the circumference of the hoop. Each of the extending rods 11 is almost completely covered with low adhesive sleeving 16 leaving only a small portion of the rods exposed.

In assembling the grill, the hoop member 13 is also covered with two long sections of low adhesive sleeving sufficient enough to extend from the intersection of the extreme longitudinal struct, said sleeving shown as dotted elements 17 and 18. In addition, the hoop is also provided with short sections of sleevings 19 provided at its end to correspond to the intersection of longitudinal rods 11. The Teflon spacers 19 are of sufficient dimensional length to cover the portions of the hoop intermediate longitudinal rod members 11 and yet leave enough of the hoop exposed so that rods 11 may be welded, braised, or soldered at their ends to a portion of the hoop as shown in weld joint 14. In addition, at the end of the two outermost longitudinal members 11 are two pairs of depending hangers 11' which may be integrally formed out of their respective rods 11, or may be separately provided and weldedly coupled to the hoop. Hangers 11' may also be provided with Teflon sleeving fitted thereover. It is obvious that these hangers will support low adhesive grill 10 when it is disposed in a corresponding baking pan having a circumference slightly larger than the hoop. Food articles such as meat, poultry, and fish are then placed on the grill in any well-known manner and may be cooked therein while being supported by longitudinal rod members 11 without the danger of food sticking to rods 11 because of its low adhesive properties. Following their cooking, the food articles may be easily removed from the grill without danger of it sticking and having to be removed by special kitchen utensils. Moreover, the grill retains very little, if any, of the cooked food articles on its surface due to its low adhesive properties and may be easily cleaned with a damp cloth and made ready for repeated use.

Figure 2:
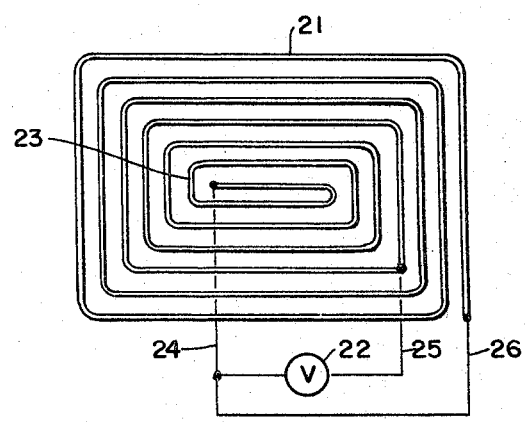
FIG. 2 shows another configuration of a grill in the form a spiralled "Calrod" element electrically coupled to a power generator.

Referring to FIG. 2, there is shown another embodiment, according to the invention, comprised of a pair coaxially wound spiral grills disposed along the same plane and having Teflon, a low adhesive material coating. The internal portion of each of the spiral grills comprises an electrical conductor that is coupled to an electrical generating source 22 so as to provide current through the conductor and produce heat in the spiral pattern due to the resistive properties of the conductor. The outer spiral 21 is coupled to generating source 22 through conductors 25 and 26. The internal spiral 23, coaxially surrounded by external spiral 21, is coupled to electrical generating source 22 by means of common conductor 25, and conductor 24. In the practical application of the device of FIG. 2, it is thus possible to selectively switch between the inner and outer spiral grills depending on the size of the food articles to be cooked. In the arrangement of the device in FIG. 2, it is also possible to selectively couple the internal and external grills either in series or in parallel, thereby adjust the heating and thus the electrical current provided to them so that the heat applied to the food article may be adjusted depending on the nature and speed of cooking.

Figure 3:
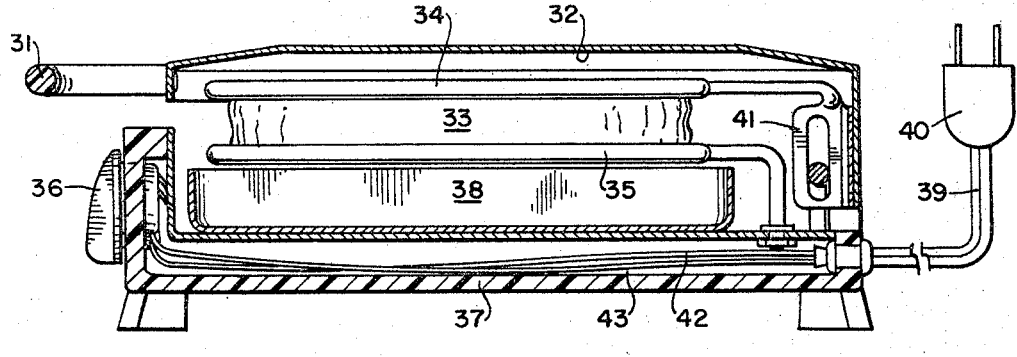
FIG. 3 is a side view partly in section of the apparatus employing the grill device of FIG. 2 for cooking food articles therebetween.

Referring to FIG. 3, there is shown a pair of grills similar to the embodiment of FIG. 2 and spaced apart in close space relationship and parallel in a "waffle iron" type of apparatus or arrangement. The grills are spaced apart so that food articles such as steaks, sandwiches and other flat food articles may be cooked therebetween. The apparatus comprises a first pair of grills 34 mounted as the upper grill and having a hinge 41 slidably engaged through a slot and pinion arrangement to base 37. Upper grill 34 is thus adjustable in height. Lower grill 35 which is mounted parallel to and in close spaced relationship with upper grill 34 is supported and secured to base 37 at one end so as to leave a space immediately beneath for the slidable insertion of a Teflon drip pan 38. Drip pan 38 serves to catch the drippings of the food articles as they are being cooked between grills 34 and 35. Upper grill 34 also contains handle 31 secured along its periphery, diametrically opposite its hinge mechanism 41. Moreover, an upper splash pan and heat deflector 32 is provided over upper grill 34 to reflect and prevent any food from splattering out of the apparatus. Deflector 32 also deflects the heat produced by grill 34 downward to food articles 33 being cooked therebetween.

The electrical connections 42 and 43 from the upper and lower grills are fed to base 37 of the apparatus and are electrically combined through a selector switch 36 mounted on the front face of said base, the output of selector switch 36 is connected to grills 34 and 35 in a manner similar to that as shown in FIG. 2. Power is provided to the apparatus by means of conventional plug 40 connected to power line 39 and coupled to base 37. As shown in FIG. 4, selector switch 36 can be adjusted throughout the temperature range of 50° F. to 600° F. by varying the power input to each of electric grills 34 and 35. In addition, an electric power control switch 38 is provided on a front face of the apparatus comprising a 3-position switch which maintains the apparatus in an "off" position when the switch is centered. When the switch is operated upwardly, only the internal portion of each of the upper and lower grills will be energized, a condition desirable for a small steak or sandwich. For large food articles, switch 38 is thrown in the downward position, whereby both the inner and outer grills are then electrically connected to the power source.

The apparatus is also provided with an indicator light 43 which lights when switch 38 is operated either in the upper or lower position.

Referring to FIG. 5, there is shown a view partly in section of a portion of a heating element that is comprised of a central tube or hollow cylinder 55 made of an elastic heat resistant material such as Teflon. Surrounding the entire outer circumference of core 55 is a spirally wound heating coil 54 comprised of an electrical resistant conductor and whose ends 52 and 51 are coupled to a power source 53. A tube of heat-resistant low adhesive sleeving 50 is placed over the core and spiral heating coil 55 to completely enclose that combination. A heat gun is applied to the shrinkable sleeving to cause it to shrink longitudinally and radially over the combination. The resultant product produced is a flexible heating element having the properties of being heat resistant, resilient, flexible, and having low adhesive properties with respect to other materials and contact therewith.

The heating element of FIG. 5 may be employed in any application requiring flexibility, such as, for instance, in electric blankets where elasticity, lightness and temperature resistance are essential. It has been found that the life and safety of the electric blanket has been substantially lengthened due to the high thermal properties of the Teflon heating element. The heating element, as described with reference to FIG. 5, can be also employed for cooking, for example, turkey or ham wherein the heating element is spirally wrapped therearound so as to completely surround the food. Power is then applied to the heating element to cook the food contained therearound.

Referring to FIG. 6A, there is shown a typical application of the heating element as is described with reference to FIG. 5. In FIG. 6A, a cookking apparatus is disclosed having a base 61 electrically coupled to conductor 39 terminating in plug 40. At the top surface of base 61 are a pair of sockets 63 spaced apart to receive a pair of jacks 62 to which is coupled the spirally wound heating element 64. Inserted within the spiral winding of said heating element is a frankfurter 65 having its circumference completely surrounded by element 64. The apparatus works as follows:

Heating element 64 is wound snugly around frankfurter 65 so that its coils are spread out throughout substantially its entire length. Electrical jacks 62 are then inserted into receiving sockets 63 which make electrical contact with conductor 39. Plug 40 is then inserted into a conventional power outlet so as to apply electrical energy to heating element 64. Base 61 is also provided with an additional electrical socket 66 located adjacent to and intermediate sockets 63. When one of plugs 62 is plugged into socket 63, the inner diameter of spiral element 64 will become enlarged to permit the insertion of large cylindrical food articles.

After the cooking of food article 65 has been completed, jacks 62 may be removed from sockets 63 thereby disconnecting heating element 64 from its electrical power source. Thus one may immerse the entire heating element after food 65 has been removed into a cleansing solution for repeated use. As indicated in the other embodiments of the invention, since a low adhesive coating is used to surround the element, one need only clean heating element 64 by dipping it into a cleansing solution and no scouring or brushing need be applied thereto.

Referring to FIG. 6B, there is shown a known variety of a frankfurter cooker having a plurality of closely spaced, parallel rollers 91. Heat is applied to each of the rollers by conventional heating coils disposed within the rollers and a cylindrical food article 92 is placed therebetween for cooking. Selector switch 93 which is coupled to indicator light 94, controls the amount of heat applied to rollers 91. Supporting stand 90 contains two walls 96 and 97 to which rollers 91 are supported therebetween. Rollers 91 are geared together to rotate slowly when driven by a motor in base 90, not shown. In addition, a thin low adhesive sleeve 98 is shrunk over each of rollers 91. The low adhesive sleeve prevents the surfaces of rollers 91 from becoming stained by the food articles and permits their being easily cleaned.

Referring to FIG. 7 there is shown another embodiment of a cross section of the heating element according to the invention comprising a stiff rod member 70 having a Teflon sleeve 71 inserted thereover and shrunk longitudinally and radially thereon. An electrical conductor 72 is spirally wrapped around coil 70 and sleeve 71 and terminates at its ends in conductors 74 and 75. A second Teflon or low adhesive sleeve larger than the first sleeve, is then inserted over the aforementioned combination. Heat or chemicals are applied thereto to shrink them or shrink over the combination of the cord, first sleeve and spiral conductor. The resultant heating elements formed by the above-mentioned methods of construction have the properties that they are not flexible but substantially stiff and may be bent or formed to take on any desired configuration since its shape is controlled by the rigidity of core 70. For example, it may be advantageous to employ the heating element of FIG. 7 in the embodiment of FIG. 6A if the frankfurters 65 that are to be cooked are approximately of the same diameter and length. In this application, one needs only slide the uniformly shaped frankfurters 65 into the longitudinal coils until its surface is substantially covered by heating element 64.

In another embodiment, the non-flexible heating element of FIG. 7 may be wrapped to a coplanar spiral as shown in the apparatus of FIG. 2 to form a grill or burner element that may replace the conventional Calrod burners presently used on electric stoves. It is well known in the art, for example, to make the heating element of FIG. 7 into a flat ribbon with a flat cross-sectional area of configuration such as that resembling the more modern Calrod heating elements used in electric stoves by making core 70 a flat ribbon rather than a circular rod so that shrinkable sleeves 71 and 73 will assume a flat oval configuration when shrunk thereupon.

In a further embodiment, the non-flexible heating element of FIG. 7 may be constructed in the form of an immersion heater having a spiral coil of the element immersed in a fluid such as a cup of coffee or tea. The conventional immersion heaters employing a bare metal spiral coil in contact with the fluid have the disadvantage that contents of the fluid stain and adhere to the heater, and in some cases, actually burn onto the surface of the metal coil, thus making it difficult to clean the unit after use. In the apparatus according to the invention however, the heat is transmitted from the electric heating coil through a non-adhesive skin to the fluid so that even if the contents of the fluid burn during their heating, they will not adhere to the non-adhesive skin of the immersion heater. This permits the heat transfer characteristics of the immersion heater to remain constant throughout its entire use and permits it to be easily cleaned for repeated use. It is also obvious that any conventional metal immersion heating element may be adapted for use according to the invention by covering it with an appropriate sleeve of shrinkable non-adhesive polyfluoride material and permitting the sleeve to be treated either by chemicals or heat so as to shrink tightly over the circumference of the coil.

In FIG. 8, there is shown a soldering iron 80 having a handle 85 and a heat shield 81. The heating element of iron 80 consists of tapered metal heat block 83 surrounded by a thin low adhesive tapered conformal sleeve 82. Electric power is provided to a conventional electrical heater (not shown) contained within metal heat block 83 by means of conductor 84 coupled to plug 86. After heat block 83 reaches maximum temperature, heat by conduction is transmitted through and along element 83 to the tip 87, lying exposed at the end of the iron. It is obvious that due to the low adhesive properties of sleeve 82, that any solder which is applied thereto for melting, or any that accidently splatters thereon, will not stick. The solder will only adhere to the exposed metallic tip 87 at the end of the iron. Sleeve 82 serves not only to protect a substantial portion of the length of the iron from corrosion and attack from chemical solders, but also serves as a thermal barrier to protect the fingers of the operator from accidental burns while in use. From experience it has been found that if one touches the iron at any point where it is protected by sleeve 82, that due to the lower coefficient of thermal conductivity with respect to the metal of element 83, that the buildup of temperature due to heat transfer is sufficiently slow to warn the operator of its contact without inflicting a serious burn. It is also of interest to note that when it becomes necessary to file the tip of the iron down after repeated use, that a small portion of sleeve 82 may be stripped away adjacent to tip 87 to permit the continued use of the iron.

While only several embodiments of the present invention have been shown and described, it is obvious that many variations in design and configuration may be proposed without departing from the scope and nature of the above-identified invention as defined in the following claims.

What I claim is:
1. A soldering iron, comprising:
electrical heater means for coupling to an electrical power source,
at least one metal heat block heated by said electrical heater means, said block being formed so as to provide a tip on the end thereof, in thermal contact with said block, and
sleeve insulating means constructed from a fluorocarbon resin material having high temperature resistant properties inserted over and in direct contact with the surface of said heat block, said sleeve means extending along and completely covering the surface of said heat block and terminating adjacent to its tip.
2. The iron, as recited in claim 1, additionally compris- ing a handle portion connected to the opposite end of said heat block, said handle being constructed from thermally insulated material.

3. The iron, as recited in claim 2, wherein said fluorocarbon resin material is Teflon.

4. The iron, as recited in claim 3, wherein said Teflon sleeve is comprised of heat shrinkable tubing.

References Cited

UNITED STATES PATENTS

| | | | |
|---|---|---|---|
| 2,814,710 | 11/1957 | Schuetze | 219—245 |
| 3,205,467 | 9/1965 | Ganci | 338—268 |
| 3,243,574 | 3/1966 | Blythe et al. | 219—250 |
| 2,751,484 | 6/1956 | Moon | 219—239 |
| 2,774,993 | 12/1956 | Hagen et al. | 264—98 |
| 2,964,065 | 12/1960 | Haroldson et al. | 138—151 |
| 3,107,197 | 10/1963 | Stein et al. | 156—244 |
| 3,196,194 | 7/1965 | Ely et al. | 264—95 |
| 3,245,599 | 4/1966 | Johnson | 228—54 |
| 3,336,462 | 8/1967 | Fuller | 219—227 |

FOREIGN PATENTS 487,178   6/1938   Great Britain.

VOLODYMYR Y. MAYEWSKY, *Primary Examiner.*

U.S. Cl. X.R.

228—54; 156—85; 161—218; 264—230; 219—530